(12) United States Patent
Bao et al.

(10) Patent No.: US 7,974,277 B2
(45) Date of Patent: *Jul. 5, 2011

(54) SYSTEM AND METHOD FOR ROUTING CALLS

(75) Inventors: Ho Bao, Richardson, TX (US); Scott A. Henning, Plano, TX (US); Christopher E. Pearce, Dallas, TX (US); James David Williams, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1066 days.

This patent is subject to a terminal disclaimer.

(21) Appl. No.: 11/068,429

(22) Filed: Feb. 28, 2005

(65) Prior Publication Data

US 2005/0147088 A1 Jul. 7, 2005

Related U.S. Application Data

(63) Continuation-in-part of application No. 09/579,399, filed on May 25, 2000, now Pat. No. 7,359,368.

(51) Int. Cl.
*H04L 12/28* (2006.01)
*H04L 12/56* (2006.01)
*H04M 7/00* (2006.01)

(52) U.S. Cl. ............... 370/389; 370/401; 379/221.12

(58) Field of Classification Search ............ None
See application file for complete search history.

(56) References Cited

U.S. PATENT DOCUMENTS

| | | |
|---|---|---|
| 4,748,658 A | 5/1988 | Gopal et al. |
| 4,757,267 A | 7/1988 | Riskin |
| 4,797,915 A | 1/1989 | Bowker et al. |
| 5,430,792 A | 7/1995 | Jesurum et al. |
| 5,652,866 A | 7/1997 | Aldred et al. ............... 395/500 |
| 5,790,647 A | 8/1998 | Gessel |
| 5,867,494 A | 2/1999 | Krishnaswamy et al. |
| 5,950,198 A | 9/1999 | Falls et al. |
| 6,144,727 A | 11/2000 | Mashinsky |
| 6,161,008 A | 12/2000 | Lee et al. |
| 6,205,214 B1 | 3/2001 | Culli et al. ............... 379/220 |
| 6,259,779 B1 | 7/2001 | Council et al. |
| 6,275,574 B1 | 8/2001 | Oran ............... 379/201 |
| 6,282,194 B1 | 8/2001 | Cheesman et al. ............ 370/356 |
| 6,304,574 B1 | 10/2001 | Schoo et al. |
| 6,304,576 B1 | 10/2001 | Corley et al. ............... 370/408 |
| 6,353,610 B1 | 3/2002 | Bhattacharya et al. ....... 370/352 |
| 6,363,065 B1 * | 3/2002 | Thornton et al. ............ 370/352 |
| 6,366,576 B1 | 4/2002 | Haga |

(Continued)

OTHER PUBLICATIONS

Cisco Systems, Inc., "System Description for the Cisco Communications Network Version 2.1," Cisco Communications Network, 42 pgs, Jan. 1999.

*Primary Examiner* — Ayaz R Sheikh
*Assistant Examiner* — Sori A Aga
(74) *Attorney, Agent, or Firm* — Baker Botts L.L.P.

(57) ABSTRACT

Routing calls includes receiving a call request at a call manager from a first endpoint. The call request includes a uniform resource identifier that associates with a second endpoint. A determination is made whether the call request associates with the call manager that received the call request. To route the call request, the call manager searches a call search space for a match to the call request. The call manager communicates the call request to the routing target.

28 Claims, 3 Drawing Sheets

U.S. PATENT DOCUMENTS

| | | | |
|---|---|---|---|
| 6,389,130 B1 | 5/2002 | Shenoda et al. | 379/221.08 |
| 6,466,570 B1 * | 10/2002 | Low et al. | 370/352 |
| 6,498,791 B2 | 12/2002 | Pickett et al. | |
| 6,522,732 B1 | 2/2003 | Pullen et al. | 379/112.02 |
| 6,560,326 B1 | 5/2003 | Clark | 379/221.09 |
| 6,570,855 B1 | 5/2003 | Kung et al. | 370/237 |
| 6,574,012 B1 | 6/2003 | Kagawa | |
| 6,584,093 B1 | 6/2003 | Salama et al. | 370/351 |
| 6,597,687 B1 | 7/2003 | Rao | 370/352 |
| 6,614,780 B2 | 9/2003 | Hakim et al. | 370/352 |
| 6,614,902 B1 | 9/2003 | Rizzetto | 379/265.11 |
| 6,657,989 B1 | 12/2003 | Hilsenrath | 370/351 |
| 6,671,262 B1 | 12/2003 | Kung et al. | |
| 6,711,159 B1 | 3/2004 | Grabelsky et al. | |
| 6,718,482 B2 | 4/2004 | Sato et al. | |
| 6,731,630 B1 * | 5/2004 | Schuster et al. | 370/356 |
| 6,751,459 B1 | 6/2004 | Lee et al. | |
| 6,760,324 B1 | 7/2004 | Scott et al. | |
| 6,760,416 B1 | 7/2004 | Banks et al. | |
| 6,785,223 B1 | 8/2004 | Korpi et al. | |
| 6,925,076 B1 | 8/2005 | Dalgic et al. | |
| 7,239,629 B1 * | 7/2007 | Olshansky et al. | 370/353 |
| 7,359,368 B1 | 4/2008 | Pearce | |
| 2002/0150080 A1 | 10/2002 | Bhattacharya et al. | |
| 2003/0123438 A1 * | 7/2003 | Li et al. | 370/356 |

* cited by examiner

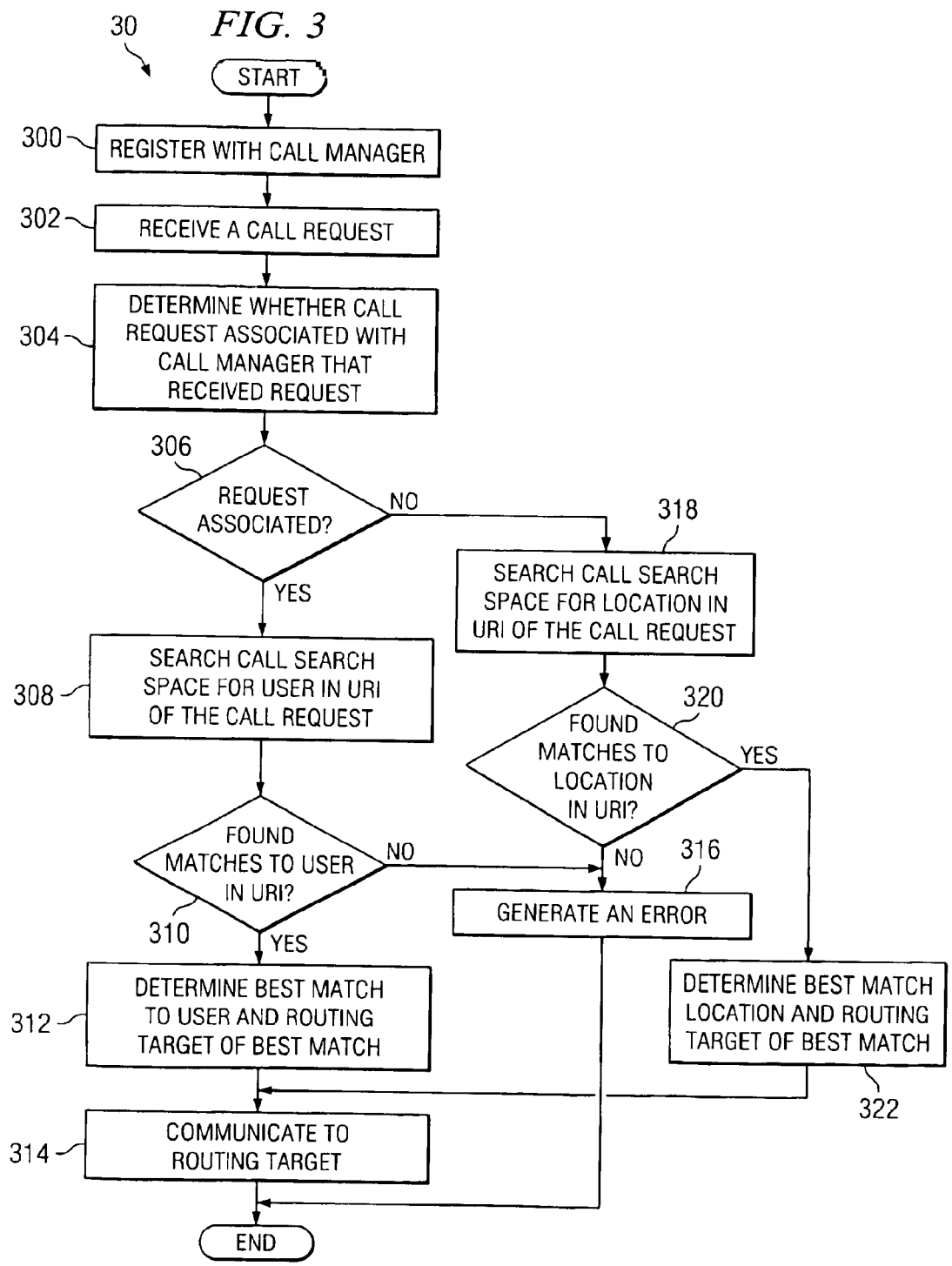

SYSTEM AND METHOD FOR ROUTING CALLS

CROSS REFERENCE TO RELATED APPLICATION

This application is a continuation-in-part of U.S. application Ser. No. 09/579,399 filed May 25, 2000 now U.S. Pat. No. 7,359,368, and entitled "System and Method for Routing Calls Using Dialing Partitions," which is hereby incorporated by reference herein.

TECHNICAL FIELD

This invention relates generally to the field of communications and more specifically to a system and method for routing calls.

BACKGROUND

Historically, telecommunications have involved the transmission of signals over a network dedicated to telecommunications. Similarly, data communications between computers have also historically been transmitted on a dedicated data network. Currently, telecommunications and data transmissions are being merged into an integrated communication network using technologies such as Voice over Packet (VoP). Since many networks transmit computer data using packet protocols, such as the Internet Protocol (IP), VoP uses this existing technology to transmit signals by converting these signals into digital data and encapsulating the data for transmission over a packet-based network.

SUMMARY OF THE DISCLOSURE

In accordance with the present invention, a system and method for distributed call routing is provided that substantially eliminates or greatly reduces disadvantages and problems associated with previously developed systems and methods. In particular, the present invention contemplates a system and method for routing a call based on the destination of the call.

According to one embodiment of the present invention, a method for routing calls includes receiving a call request at a call manager from a first endpoint. The call request includes a uniform resource identifier (URI) associated with a second endpoint. The method also includes determining whether the call request associates with the call manager that received the call request. The call manager searches a call search space for a match to the call request. The method includes communicating the call request to the routing target.

In another embodiment of the present invention, a call manager includes a call control module that receives a call request from a first endpoint. The call request includes a URI associated with a second endpoint. The call manager also includes a digit analysis module that receives the URI included in the call request from the call control module. The digit analysis module also determines whether the call request associates with the call manager that received the call request. The digit analysis module searches a call search space.

Technical advantages of the invention include a system and method for routing calls that allow for selective routing of calls based on characteristics of the device receiving the call. For example, endpoint 100 may contact an end destination using a computer's IP address or a domain name in addition to using a telephone number.

Other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, like numerals being used for like and corresponding parts of the various drawings in which:

FIG. 3 illustrates exemplary procedures for communicating a call request to a routing target.

DETAILED DESCRIPTION OF THE DRAWINGS

Figure 1:
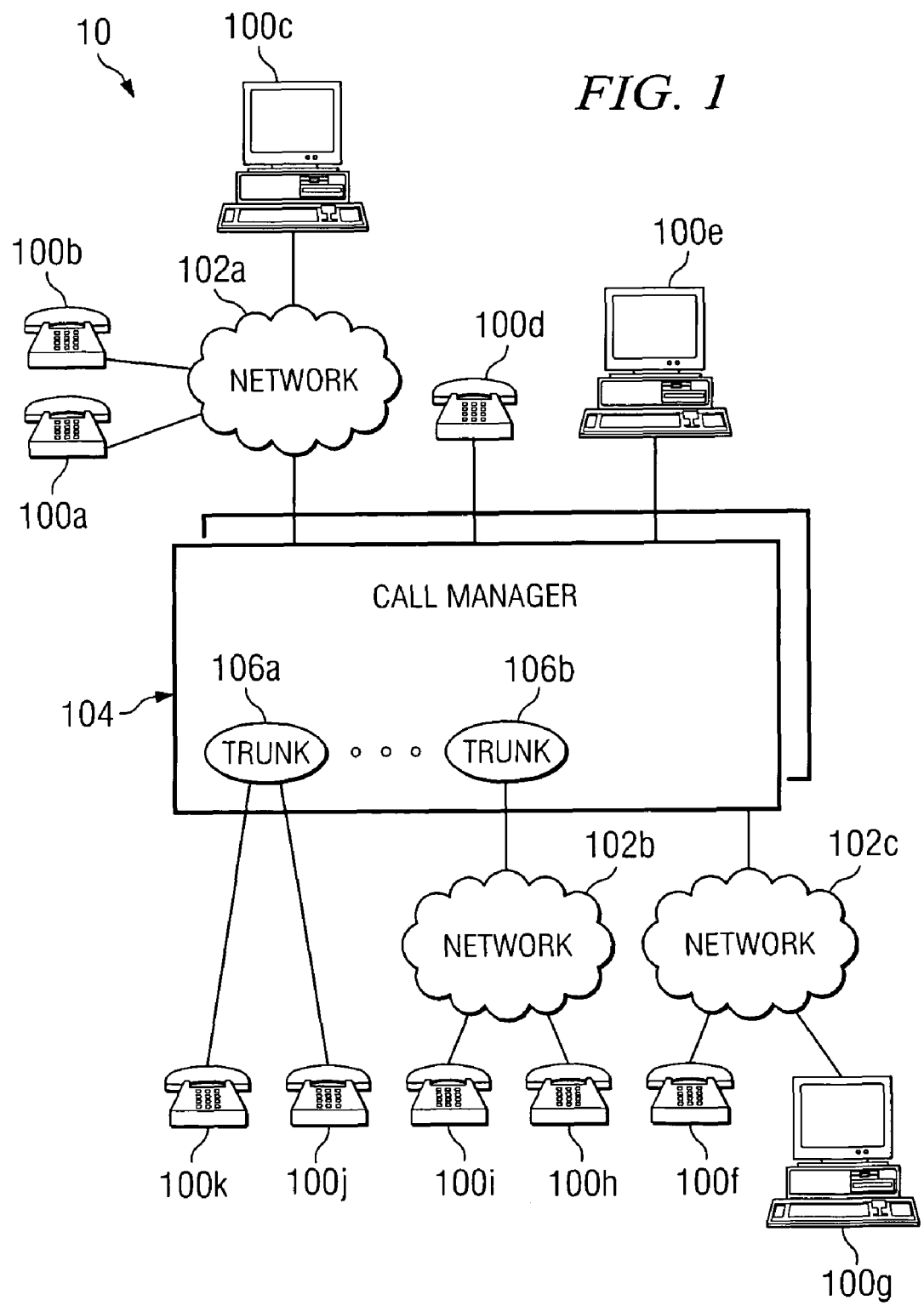
FIG. 1 illustrates an exemplary communication network.

FIG. 1 illustrates an exemplary communication network system 10. System 10 facilitates communication between endpoints. In general, system 10 includes one or more endpoints 100a through 100k (referred to collectively as endpoints 100); one or more networks 102a, 102b, 102c (referred to collectively as networks 102); and one or more call managers 104 that combine to facilitate the communication between endpoints.

Endpoints 100 may include any combination of hardware and/or software that provide communication services. Endpoints 100 may include Internet protocol (IP) telephony devices, personal computers, wireless communication devices, personal digital assistants (PDAs), or any other suitable device. IP telephony devices may include telephones, fax machines, computers running telephony software, gateway devices, or any other device capable of performing telephony functions in an IP network. Endpoints 100 may also include trunks 106a and 106b (referred to collectively as trunks 106) that provide a communication channel to another endpoint, such as a telephone. Trunks 106 are communication channels between call manager 104 and other endpoints 100 that an initiating endpoint 100 attempts to reach. Trunks 106 may include any appropriate channel that handles signals and communicates signals over a pathway. Endpoints 100 may include networks 102. Although a particular number of endpoints 100 are illustrated, system 10 contemplates any number and arrangement of endpoints 100.

Endpoints 100 send call requests to call manager 104 to establish a communication session with other endpoints 100. The call request may include a uniform resource identifier (URI), or part thereof, which is used to identify endpoints 100. The URI may come in the following forms: x@host, x@IPaddress, x@Domain, or any other suitable form in which to identify endpoints 100. In this disclosure, "user" refers to anything on the left hand side of the at sign and "location" refers to anything on the right hand side of the at sign. The URI may include a host address or a domain name. The host address may be in the form of a fully qualified domain name (FQDN) of the host or the numeric IP address of the host. Furthermore, host addresses may be supported by allowing an administrator to define routing target matches in the form of specific IP addresses, IP subnets, or FQDN host names. The domain name may be in the form of an organization's top level domain (TLD) such as x.com or include a FQDN, such as www.sub.x.com. Domain names may be supported by enabling an administrator to define routing target matches in the form of complete or partial domain names.

Networks 102 represent any suitable combination or arrangement of components supporting communications between endpoints 100. For example, network 102 may include one or more local area networks (LANs); one or more wide area networks (WANs); a global distributed network such as the Internet, Intranet, or Extranet; any other form of a wireless or wireline communication network; components of other suitable communications network; or any combination of the preceding. Generally, networks 102 provide for the communication of packets, cells, frames, or other portions of information between endpoints 100. Networks 102 may include any combination of gateways, routers, hubs, switches, and any other hardware and/or software that may implement session initiation protocol (SIP).

Call managers 104 manage one or more endpoints 100 and the communication between endpoints 100. Call manager 104 is an application that controls call processing, routing, telephone features and options (such as call hold, call transfer, and caller identification), device configuration, and other telephony functions and parameters within system 10. Call manager 104 controls one or more endpoints 100 coupled to networks 102 or endpoints 100 may couple directly to call manager 104. Call manager 104 may also control endpoints 100 located elsewhere in system 10. Software executing on one or more computers coupled to system 10 implements call manager 104. Control of endpoints 100 may be distributed dynamically in response to changes in communication network 10. For example, if call manager 104 goes off-line, endpoint 100 that is controlled by that call manager 104 may connect and register with an alternative call manager 104 in system 10. Likewise, if a communication link between endpoint 100 and call manager 104 goes down, endpoint 100 may connect and register with alternative call manager 104 to which there is an operating communication path. Furthermore, the distributed control of endpoints 100 also provides for network scalability and load-sharing by allowing endpoints 100 to be controlled by any call manager 104, regardless of physical location, to avoid excess load on a particular call manager 104 when new endpoints 100 come on-line or to provide load balancing between call managers 104. Computer-readable medium, including, but not limited to hard drives, diskettes, CD-ROMs, DVD-ROMs, or other optical or magnetic storage devices may embody the software of call manager 104.

In operation, endpoints 100 register with call manger 104. Endpoints 100 may register with any call manager 104 with which it can communicate by sending call manager 104 a registration request. Endpoints 100 may initiate a call request to contact another endpoint 100. The call request is sent to call manager 104 from initiating endpoint 100. Call manager 104 determines the routing target of the call request based on the URI in the call request. Call manager 104 routes the call request to the appropriate routing target. Once the end destination receives the call request, call manager 104 establishes communication between endpoints 100.

Figure 2:
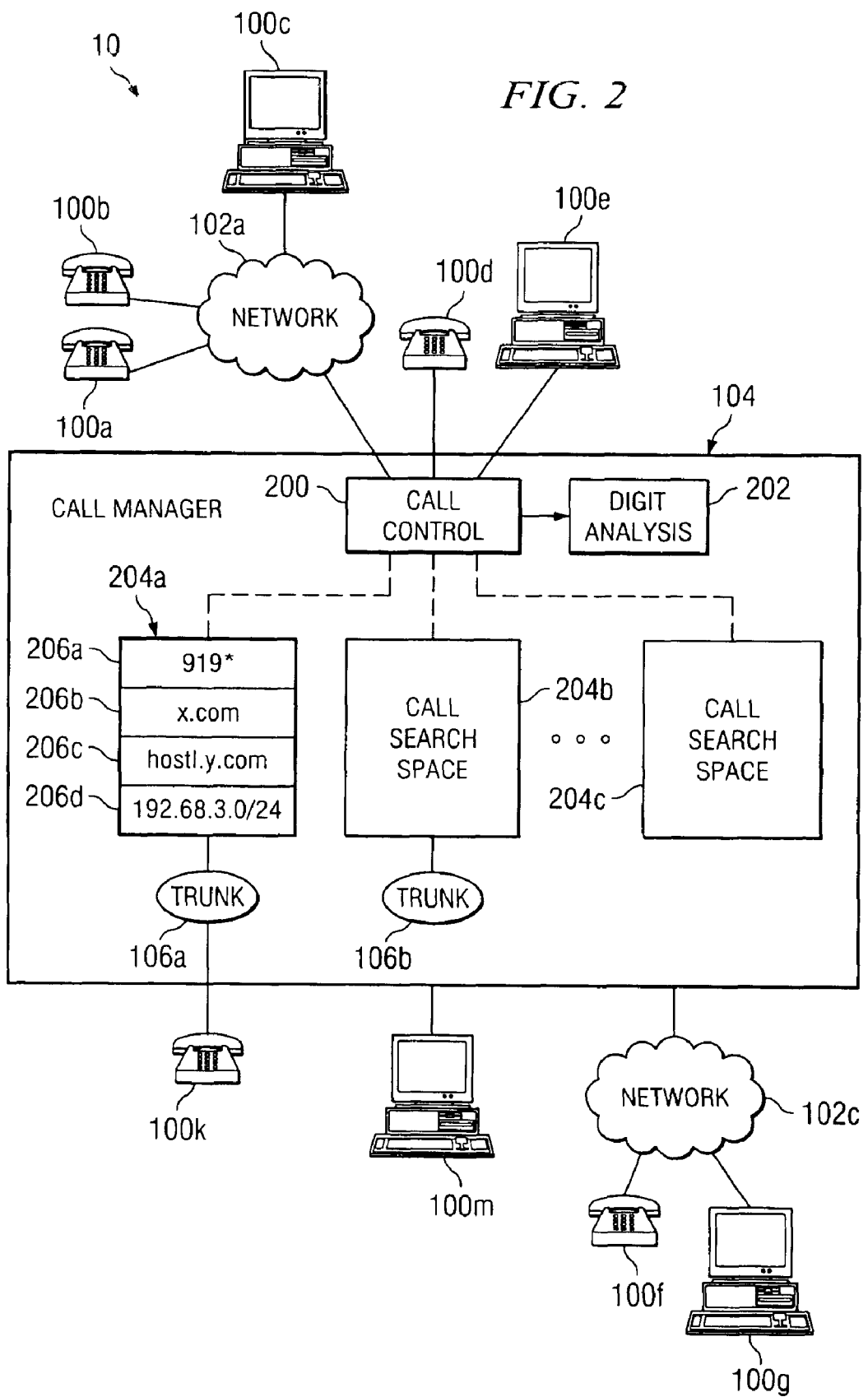
FIG. 2 illustrates an exemplary call manager.

FIG. 2 illustrates an exemplary call manager 104 to manage, control, and facilitate communication to and from endpoints 100. In general, call manager 104 includes a call control module 200 (CCM 200); a digit analysis module 202 (DAM 202); and call search spaces 204a, 204b, 204c (referred to collectively as CSS 204) to facilitate the communication between endpoints 100.

CCM 200 acts as the central control component of call manager 104. Any suitable software, program, or code may implement the functions of CCM 200. CCM 200 completes such processes, but not limited to, receiving the call request from endpoint 100, receiving the routing target information from DAM 202, and communicating the call request.

DAM 202 may act with CCM 200 to complete the call request. Any suitable software, program, or code may implement the functions of DAM 202. DAM 202 determines the routing target denoted by the URI in the call request. DAM 202 makes this determination by searching CSS 204. DAM 202 searches CSS 204 for one or more patterns that match the URI denoted by the call request. Upon determining the appropriate route, DAM 202 informs CCM 200 of the routing target.

CSS 204 may include a list of partitions 206a, 206b, 206c, and 206d (referred to collectively as partitions 206) in which DAM 202 may search for one or more matches to the URI in the call request. CSS 204 determines partition 206 in which DAM 202 may consider when attempting to find a match to route the call request. DAM 202 searches partitions 206 contained within CSS 204. Call manager 104 may use CSS 204 for call forwarding, message waiting indicators, or for any other suitable purpose. CSS 204 may combine to form a union of all partitions 206 listed in each CSS 204. Multiple CSS 204 may combine by associating one CSS 204 with a device record and another CSS 204 with a line record, or any suitable method that results in the combination of multiple CSS 204.

Partitions 206 contain patterns in a logical grouping. These patterns may be IP addresses or domain names. Different types of patterns may share the same partition 206, IP addresses and domain names may both be in partition 206. For IP addresses, the pattern may specify a subnet, not necessarily a specific address of endpoint 100. For example, 192.168.blank.blank/16 may be a pattern in partition 206. For domain names, the pattern may make provisions for wildcards, such as *.cisco.com, where * is a wildcard that expands the search. When searching for one or more matches in partitions 206, DAM 202 may use the wildcards to match against the call request call manager 104 receives. The patterns in partitions 206 do not match the user@location format of the call request. Instead, DAM 202 searches for the user and the location separately in partitions 206. DAM 202 searches partitions 206 in CSS 204 and selects one or more matches. From among all candidate matches, DAM 202 determines the best match to the URI of the call request.

In operation, endpoints 100 register with call manager 104. Endpoints 100 may generate a call request to establish a communication session with other endpoints 100. CCM 200, or any other appropriate component of call manager 104, receives the call request from endpoint 100. CCM 200 may modify the call request based on the target endpoint 100. For instance, CCM 200 may truncate a fully qualified domain name (www.x.com) to only include the domain name (x.com). CCM 200 communicates the URI in the call request to DAM 202. DAM 202 may receive the URI directly from CCM 200 or any other suitable process in the same or a different call manager 104.

DAM 202 searches CSS 204 for the routing target denoted by the URI in the call request. When searching CSS 204, DAM 202 searches partitions 206 for matches to the call request. To perform the search, DAM 202 determines whether the location in the URI associates with call manager 104. For example, in partition 206b, x.com may be the location specified in the URI of a call request. If the location does not associate with call manager 104, DAM 202 searches all CSS 204 for matches to the location in the URI. If the location in the URI associates with call manager 104, DAM 202 searches CSS 204 for the user in the URI. For example, if the URI is 5551212@example.com and "example.com" associates with call manager 104, DAM 202 searches for the user in CSS 204.

When trying to find a match to the location or the user in the URI, DAM 202 searches for all possible matches in partitions

206. From the possible matches, DAM 202 determines the best match to the URI in the call request. Upon determining the best match, DAM 202 sends the routing target information to CCM 200. CCM 200 communicates the call request to the routing target. The routing target includes endpoint 100 denoted by the URI that matches the URI from the call request. CCM 200 establishes the call or other communication between endpoints 100.

If DAM 202 does not find a match to the location or user in the URI in partitions 206, DAM 202 sends that result to CCM 200. CCM 200 generates an error response and sends the error to initiating endpoint 100.

An element of system 10 may include any suitable configuration of an interface, logic, and memory for performing the operation of the element. An interface refers to any suitable structure of a device operable to receive input for the device, send output from the device, or both, and may comprise one or more ports.

Logic refers to any suitable hardware, software, or combination of hardware and software. For example, logic may comprise a processor. A processor may refer to any suitable device operable to execute instructions and manipulate data to perform operations. Memory refers to any structure operable to store and facilitate retrieval of information used by a processor, and may comprise Random Access Memory (PAM), Read Only Memory (ROM), magnetic drives, disk drives, Compact Disk (CD) Drives, Digital Video Disk (DVD) drives, removable dialog storage, any other suitable data storage device, or a combination of any of the preceding.

Modifications, additions, or omissions may be made to system 10 without departing from the scope of the invention. For example, CCM 200 may search partition 206 instead of DAM 202.

Moreover, the operations of system 10 may be performed by more, fewer, or other modules. For example, system 10 may have one call manager 104 or more than one call manager 104. System 10 may include any number of endpoints 100. The components of system 10 may be integrated or separated according to particular needs. Additionally, the operations of system 10 may be performed using any suitable logic comprising software, hardware, other logic, or any suitable combination of the preceding. As used in this document, "each" refers to each member of a set or each member of a subset of a set.

FIG. 3 is a flowchart 30 of one embodiment of a method for routing calls in system 10. Endpoints 100 register with call manager 104 at step 300. Call manager 104 receives a call request at step 302. At step 304, call manager 104 determines whether the call request associates with call manager 104. If the call request associates with call manager 104 at step 306, call manager 104 searches CSS 204 for one or more matches to the user in the URI of the call request in step 308. If call manager 104 finds one or more matches for the user at step 310, call manager 104 then determines a best match to the requested user and determines the routing target of the best match at step 312. Call manager 104 communicates the call request to the routing target at step 314 and the method ends.

At step 310, if call manager 104 does not find one or more matches for the user in the requested URI, call manager 104 generates an error response at step 316. The method subsequently ends.

If the call request is not associated with call manager 104 at step 306, call manager 104 searches CSS 204 for the location in the URI of the call request at step 318. If call manager 104 finds one or more matches for the location at step 320, call manager 104 then determines a best match to the requested location and determines the routing target of the best match at step 322. Upon finding the best match to the requested location at step 322, call manager 104 communicates the call request to the routing target at step 314 and the method ends. But if call manager 104 does not find the location in CSS 204, call manager 104 generates an error response at step 316 and the method ends.

The method described is only an example of routing calls in a communication network. Modifications, additions, or omissions may be made to the methods without departing from the scope of the invention. The methods may include more, fewer, or other steps. Additionally, steps may be performed in any suitable order without departing from the scope of the invention.

While this disclosure has been described in terms of certain embodiments and generally associated methods, alterations and permutations of the embodiment and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A method for routing calls, comprising:
   receiving a call request at a call manager from a first endpoint, the call request including a uniform resource identifier (URI) comprising a first portion identifying a user associated with a second endpoint and a second portion identifying a location associated with the second endpoint;
   modifying the call request according to the second endpoint;
   determining whether the modified call request associates with the call manager that received the call request, the determination based on whether the second portion of the URI that identifies the location associated with the second endpoint is associated with the call manager;
   searching a call search space including a plurality of partitions in the call manager, each partition comprising patterns in a logical grouping for determining a match to the modified call request, wherein searching a call search space comprises:
      searching the call search space for the first portion of the URI that identifies the user associated with the second endpoint if the location associated with the second endpoint is associated with the call manager that received the call request;
      searching the call search space for the second portion of the URI that identifies the location associated with the second endpoint if the location associated with the second endpoint is not associated with the call manager that received the call request;
   communicating the call request to a routing target.

2. The method of claim 1, wherein searching a call search space includes selecting one or more patterns that match the URI in the modified call request.

3. The method of claim 1, wherein the patterns in the plurality of partitions do not match a format of the URI in the call request, and wherein searching a call search space comprises:
   searching the plurality of partitions for a plurality of candidate matches to the URI in the modified call request; and
   determining a best match to the URI from one or more patterns that match the URI in the plurality of candidate matches.

4. The method of claim 1, wherein communicating the call request to the routing target includes communicating the call request to the second endpoint having the URI that best matches the URI of the call request.

5. The method of claim 1, further comprising:
generating an error response if the call search space does not have a best match to the URI denoted by the call request.

6. A call manager, comprising:
a call control module operable to receive a call request from a first endpoint, the call request including a uniform resource identifier (URI) comprising a first portion identifying a user associated with a second endpoint and a second portion identifying a location associated with the second endpoint, the call control module further operable to modify the call request according to the second endpoint;
a digit analysis module operable to: receive the URI included in the call request from the call control module, determine whether the modified call request is associated with the call manager that received the call request based on whether the second portion of the URI that identifies the location associated with the second endpoint is associated with the call manager, search a call search space including a plurality of partitions, each partition comprising patterns in a logical grouping to determine a routing target associated with the modified call request, wherein the digit analysis module:
searches the call search space for the first portion of the URI that identifies the user associated with the second endpoint if the location associated with the second endpoint is associated with the call manager that received the call request;
searches the call search space for the second portion of the URI that identifies the location associated with the second endpoint if the location associated with the second endpoint is not associated with the call manager that received the call request.

7. The call manager of claim 6, wherein the call control module is operable to: receive the routing target from the digit analysis module, the call control module operable to communicate the call request to the routing target.

8. The call manager of claim 6, wherein the URI includes a selected one of a domain name or an Internet Protocol (IP) address.

9. The call manager of claim 6, wherein the call control module is operable to communicate the call request to the routing target having the URI that best matches the URI of the call request.

10. The call manager of claim 6, wherein the digit analysis module selects one or more patterns that match the URI in the modified call request.

11. The call manager of claim 6, wherein the patterns in the plurality of partitions do not match a format of the URI in the call request, and wherein the digit analysis module is operable to search the call search space by:
searching the plurality of partitions for a plurality of candidate matches to the URI in the modified call request; and
determining a best match for the URI from one or more patterns that match the URI in the plurality of candidate matches.

12. The call manager of claim 6, wherein call control module is operable to generate an error response if the call request is not in a partition table.

13. A non-transitory computer readable medium including logic for routing calls, the logic operable to:
receive a call request at a call manager from a first endpoint, the call request including a uniform resource identifier (URI) comprising a first portion identifying a user associated with a second endpoint and a second portion identifying a location associated with the second endpoint;
modify the call request according to the second endpoint;
determine whether the modified call request associates with the call manager that received the call request, the determination based on whether the second portion of the URI that identifies the location associated with the second endpoint is associated with the call manager;
search a call search space including a plurality of partitions, each partition comprising patterns in a logical grouping for determining a best match to the modified call request, wherein searching a call search space comprises:
searching the call search space for the first portion of the URI that identifies the user associated with the second endpoint if the location associated with the second endpoint is associated with the call manager that received the call request;
searching the call search space for the second portion of the URI that identifies the location associated with the second endpoint if the location associated with the second endpoint is not associated with the call manager that received the call request;
communicate the call request to a routing target.

14. The non-transitory computer readable medium of claim 13, wherein searching a call search space includes selecting one or more patterns that match the URI in the modified call request.

15. The non-transitory computer readable medium of claim 13, wherein the patterns in the plurality of partitions do not match a format of the URI in the call request, and wherein searching a call search space comprises:
searching the plurality of partitions for a plurality of candidate matches to the URI in the modified call request; and
determining a best match to the URI from one or more patterns that match the URI in the plurality of candidate matches.

16. The non-transitory computer readable medium of claim 13, wherein communicating the call request to the routing target includes communicating the call request to the second endpoint having the URI that best matches the URI of the call request.

17. The non-transitory computer readable medium of claim 13, wherein the logic is operable to:
generate an error response if the call request is not in a partition table.

18. A call manager, comprising:
means for receiving a call request at a call manager from a first endpoint, the call request including a uniform resource identifier (URI) comprising a first portion identifying a user associated with a second endpoint and a second portion identifying a location associated with the second endpoint;
means for modifying the call request according to the second endpoint;
means for determining whether the call request associates with the call manager that received the modified call request, the determination based on whether the second portion of the URI that identifies the location associated with the second endpoint is associated with the call manager;
means for searching a call search space including a plurality of partitions, each partition comprising patterns in a logical grouping for determining a best match to the modified call request, wherein means for searching a call search space comprises:
   means for searching the call search space for the first portion of the URI that identifies the user associated with the second endpoint if the location associated with the second endpoint is associated with the call manager that received the call request;
   means for searching the call search space for the second portion of the URI that identifies the location associated with the second endpoint if the location associated with the second endpoint is not associated with the call manager that received the call request;
means for communicating the call request to a routing target.

19. The call manager of claim 18, further comprising:
means for selecting one or more patterns that match the URI in the modified call request.

20. The call manager of claim 18, wherein the patterns in the plurality of partitions do not match a format of the URI in the call request, and wherein the means for searching the call search space comprises:
   means for searching the plurality of partitions for a plurality of candidate matches to the URI in the modified call request; and
   means for determining a best match to the URI from one or more patterns that match the URI in the plurality of candidate matches.

21. The call manager of claim 18, further comprising:
means for generating an error response if the call search space does not have a best match to the URI denoted by the call request.

22. A system for routing calls, comprising:
a plurality of subscribers operable to communicate with each other;
a call manager operable to control the communication between the plurality of subscribers, wherein the call manager includes a call control module operable to receive a call request from a first endpoint, the call request including a uniform resource identifier (URI) comprising a first portion identifying a user associated with a second endpoint and a second portion identifying a location associated with the second endpoint, the call control module operable to modify the call request according to the second endpoint; a digit analysis module operable to receive the URI included in the modified call request from the call control module, the digit analysis module operable to determine whether the modified call request is associated with the call manager that received the call request, the determination based on whether the second portion of the URI that identifies the location associated with the second endpoint is associated with the call manager, the digit analysis module operable to search a call search space including a plurality of partitions, each partition comprising patterns in a logical grouping, wherein the digit analysis module is further operable to:
   search the call search space for the first portion of the URI that identifies the user associated with the second endpoint if the location associated with the second endpoint is associated with the call manager that received the call request;
   searching the call search space for the second portion of the URI that identifies the location associated with the second endpoint if the location associated with the second endpoint is not associated with the call manager that received the call request.

23. The system of claim 22, wherein the patterns in the plurality of partitions do not match a format of the URI in the call request, and wherein the digit analysis module is operable to search the call search space by:
   searching the plurality of partitions for a plurality of candidate matches to the URI in the modified call request; and
   determining a best match to the URI from the patterns that match the URI in the plurality of candidate matches.

24. The method of claim 1, wherein searching the call search space comprises using one or more wildcards in at least one of the first portion of the URI or the second portion of the URI to expand the search.

25. The call manager of claim 6, wherein while searching the call search space, the digit analysis module uses one or more wildcards in at least one of the first portion of the URI or the second portion of the URI to expand the search.

26. The non-transitory computer readable medium of claim 13, wherein searching the call search space comprises using one or more wildcards in at least one of the first portion of the URI or the second portion of the URI to expand the search.

27. The call manager of claim 18, wherein the means for searching the call search space comprises means for using one or more wildcards in at least one of the first portion of the URI or the second portion of the URI to expand the search.

28. The system of claim 22, wherein while searching the call search space, the digit analysis module uses one or more wildcards in at least one of the first portion of the URI or the second portion of the URI to expand the search.

* * * * *